US011089261B2

(12) United States Patent
Diggins

(10) Patent No.: US 11,089,261 B2
(45) Date of Patent: Aug. 10, 2021

(54) IMAGE COMPONENT DETECTION

(71) Applicant: Imagination Technologies Limited, Kings Langley (GB)

(72) Inventor: Jonathan Diggins, Waterlooville (GB)

(73) Assignee: Imagination Technologies Limited, Kings Langley (GB)

(*) Notice: Subject to any disclaimer, the term of this patent is extended or adjusted under 35 U.S.C. 154(b) by 115 days.

(21) Appl. No.: 16/457,984

(22) Filed: Jun. 29, 2019

(65) Prior Publication Data

US 2020/0007817 A1 Jan. 2, 2020

(30) Foreign Application Priority Data

Jun. 29, 2018 (GB) .................................... 1810778

(51) Int. Cl.
| | | |
|---|---|---|
| *H04N 7/01* | (2006.01) | |
| *G06K 9/00* | (2006.01) | |
| *G06K 9/03* | (2006.01) | |
| *G06T 5/30* | (2006.01) | |
| *G06T 7/20* | (2017.01) | |

(52) U.S. Cl.
CPC ......... *H04N 7/013* (2013.01); *G06K 9/00711* (2013.01); *G06K 9/03* (2013.01); *G06T 5/30* (2013.01); *G06T 7/20* (2013.01); *G06T 2207/10016* (2013.01); *G06T 2207/20192* (2013.01)

(58) Field of Classification Search
CPC .... H04N 7/013; H04N 7/0137; H04N 7/0127; H04N 7/014; G06K 9/00711; G06K 9/03; G06T 5/30; G06T 7/20; G06T 2207/10016; G06T 2207/20192

USPC ......................................................... 382/257
See application file for complete search history.

(56) References Cited

U.S. PATENT DOCUMENTS

| | | | | |
|---|---|---|---|---|
| 2012/0177249 A1* | 7/2012 | Levy | ................... | G06K 9/00711 382/103 |
| 2015/0189182 A1* | 7/2015 | Ho | ........................... | G06T 5/002 348/208.6 |
| 2019/0045193 A1* | 2/2019 | Socek | ................... | H04N 19/543 |

FOREIGN PATENT DOCUMENTS

WO WO-9921135 A1 * 4/1999 ............. G06T 7/223

* cited by examiner

*Primary Examiner* — Amandeep Saini
(74) *Attorney, Agent, or Firm* — Potomac Law Group, PLLC; Vincent M DeLuca

(57) ABSTRACT

A processor unit configured to identify blocks of a frame of a video sequence to be excluded from a motion-compensated operation, the processor unit comprising: a frame processor configured to process pixel values of a first frame to characterise blocks of one or more pixels of the first frame as representing at least a portion of a graphic object; a frame-difference processor configured to determine difference values between blocks of the first frame and corresponding blocks of a second frame, and to process said difference values to characterise blocks of the first frame as representing an image component that is static between the first and second frames; a block identifier configured to identify blocks of the first frame as protected blocks in dependence on blocks characterised as: (i) representing at least a portion of a graphic object; and (ii) representing an image component that is static between the first and second frames, wherein the identified protected blocks are to be excluded from the motion compensated operation.

19 Claims, 11 Drawing Sheets

IMAGE COMPONENT DETECTION

BACKGROUND

This invention relates to identifying blocks of a video frame to be protected from motion compensation.

A video sequence comprises a plurality of frames which are to be played out sequentially. The frame rate of a video sequence indicates the rate at which the frames are to be played out in order to correctly play the video sequence. For example, a video sequence may be a film having a frame rate of 24 frames per second. As another example, a video sequence may have a frame rate of 50 or 60 frames per second (e.g. for television broadcast). Other video sequences may have other frame rates. Each frame of the video sequence comprises a plurality of pixels which form an image. For example, a frame of a High Definition video sequence may for example be an image formed by an array of pixel values at each of 1920×1080 possible pixel locations.

In other examples pixel values may exist at some, but not all, of the possible pixel locations. For example, in an interlaced system, pixel values may exist for alternate rows of the possible pixel locations, such that a partial image is formed. These partial images may be known as "fields", and two fields, often sampled at different times, comprise a complete frame. In these other examples, multiple partial images (or "fields") may be used to determine complete images (or "frames"), e.g. by a process called de-interlacing.

For clarity, the following description describes systems operating on complete frames. All of the methods described herein may equally be applied to video sequences comprising fields or complete frames, and the use of the term "frame" should be understood to refer to either complete frames or fields as appropriate.

A frame rate converter (FRC) may be used to alter the frame rate of a video sequence. A process of frame rate conversion applied by a frame rate converter may include adding frames into the video sequence and/or removing frames from the video sequence. In a simple example, a frame rate converter may double the frame rate of a video sequence (e.g. from 24 frames per second to 48 frames per second) by inserting a frame between each pair of existing frames in the video sequence. In one example, each of the frames which are inserted into the video sequence may simply be a copy of one of the existing frames, e.g. such that each frame of the existing video sequence is played out twice in a row, but at twice the speed of the original video sequence. In this example, the perceptual smoothness of the video sequence might not be significantly improved by doubling the frame rate, but this frame rate conversion does allow the video sequence, which originally has one frame rate, to be outputted at a different frame rate (e.g. when a film is broadcast on a television signal).

More complex frame rate converters attempt to determine what a frame would look like at a point in time between two of the existing frames of the video sequence to thereby generate a new frame (which may be referred to as an interpolated frame) for inclusion in the video sequence between the two existing frames. For example, the frame rate converter may contain a motion estimator that performs a motion estimation stage to track the way that parts of an image move between one frame and the next. A known motion estimator is the block-based type, in which a frame of a video sequence is divided into a number of blocks each containing one or more pixels, and for each block a vector (referred to as a "motion vector") is found that represents the motion of the pixels in that block between the two existing frames. In one example, the determination of the motion vector for a block of a current frame involves searching the previous frame in the video sequence to find the area of image data of the previous frame with contents that are most similar to the contents of the block of the current frame. Other factors may also be involved in the determination of the motion vector for a block. The motion vectors can be used to produce an interpolated frame at an intermediate position (given by a temporal phase, $\Phi$) between two existing frames in a video sequence. The temporal phase $\Phi$ may take values between 0 and 1, where $\Phi=0$ for an intermediate frame temporally aligned with a first frame of the video sequence and $\Phi=1$ for an intermediate frame temporally aligned with a second frame of the sequence adjacent to the first frame. For example, if the interpolated frame is to be included at the mid-point between two adjacent existing frames (i.e. if the temporal phase, $\Phi$, of the interpolated frame is 0.5) then each motion vector determined between the two existing frames may be halved (i.e. multiplied by the temporal phase, $\Phi$) and then used to determine a location at which image data from one or both of the existing frames should be positioned for use in representing the interpolated frame.

An image depicted by a frame, or sequence of frames, may contain regions which remain stationary between successive frames of the sequence, even when other regions of the frames represent moving objects. These stationary regions may for example contain graphic objects such as a broadcaster's logo, a scoreboard, subtitles, static text, or a combination of such objects. There may be a risk that such objects may contain conversion artefacts (e.g. dragging, rendering over etc.) in the interpolated frame. These conversion artefacts may arise from the fact that the graphic objects remain stationary between frames of the video sequence whereas other surrounding regions of the image may undergo movement. As an example of how these conversion artefacts may arise, consider the possible situation where the motion estimator of the FRC matches a block of a first frame to a block of a second, successive, frame. In this case a motion vector may be found for the block of the first frame even though part or all of the block in fact represents a static graphic object. This motion vector may be a result of motion estimator behaviour which is generally advantageous (such as enforcing spatial consistency of the motion vector field), but which is not ideal for blocks that contain static graphic objects. A human viewer may be particularly sensitive to artefacts arising from erroneous motion vectors found for static graphic objects, and less so to artefacts in moving background images. Without knowledge of the structure of the scene, and the significance of the different elements in it, the motion estimator may not always make the correct decisions. In the case of a motion vector being incorrectly assigned to a static graphic object, this may result in the graphic object being moved between the first frame and interpolated frame and from the interpolated frame to the second frame. This example of a motion compensation artefact may manifest itself as a flickering of the graphic object when the video sequence is played out to a user.

BRIEF SUMMARY

According to one aspect of the present disclosure there is provided a processor unit configured to identify blocks of a frame of a video sequence to be excluded from a motion-compensated operation, the processor unit comprising: a frame processor configured to process pixel values of a first frame to characterise blocks of one or more pixels of the first frame as representing at least a portion of a graphic object; a frame-difference processor configured to determine difference values between blocks of the first frame and corresponding blocks of a second frame, and to process said difference values to characterise blocks of the first frame as representing an image component that is static between the first and second frames; a block identifier configured to identify blocks of the first frame as protected blocks in dependence on blocks characterised as: (i) representing at least a portion of a graphic object; and (ii) representing an image component that is static between the first and second frames, wherein the identified protected blocks are to be excluded from the motion compensated operation.

The block identifier may be configured to generate a protective key signal that identifies the protected blocks to be protected from the motion compensation operation.

The processor unit may further comprise a motion-compensated operation unit for performing the motion compensated operation on the first frame using motion vectors for blocks of the first frame generated by a motion estimator, the motion-compensated operation unit being configured to perform the motion compensated operation on non-protected blocks of the first frame and to exclude the protected blocks of the first frame from the motion-compensated operation.

The motion compensated operation unit might force values of protected blocks to a non-motion compensated blend.

The frame processor may comprise a filter module configured to perform a filtering stage on the first frame to enhance image features having characteristics indicative of a graphic object.

The frame-difference processor may comprise a filter module configured to perform a filtering stage on the difference values to enhance image features depicted by the difference values having characteristics indicative of a graphic object.

The filter module of the frame processor and the filter module of the frame-difference processor may be configured to enhance edges of features having characteristics indicative of the graphical object.

The frame processor may be configured to generate a first score for each block of the first frame indicative of a confidence level that said block represents at least a portion of the graphic object.

The frame processor may comprise a thresholding unit configured to, for each block of the first frame, characterise the block as representing at least a portion of the graphic object in dependence on a comparison of the first score with a first threshold value.

The frame processor may further comprise a dilation unit configured to perform a dilation operation using a dilating kernel, the dilation operation comprising applying the dilating kernel to blocks with a first score indicative of a high confidence level.

A block with a high confidence level may be determined from a comparison of the first score of the first block with a second threshold value.

The dilation operation may comprise characterising each block within the dilating kernel as representing the graphic object.

The frame-difference processor may be configured to generate a second score for each block of the first frame indicative of a confidence level that said block represents a static image component.

The frame-difference processor may comprise a thresholding unit configured to, for each block of the first frame, characterise the block as not representing a static image component in dependence on a comparison of the second score for that block with a third threshold value.

The frame-difference processor may further comprise a dilation unit configured to perform a dilation operation using a dilating kernel, the dilation operation comprising applying the dilating kernel to blocks with a second score indicative of a low confidence level.

The dilation operation may comprise characterising each block within the dilating kernel as not representing a static image component.

The frame-difference processor may be configured to determine the blocks characterised as representing a static image component from the blocks characterised as not representing a static image component.

The block identifier may further comprise a candidate-block identifier configured to, for each block of the first frame, identify the block as a candidate protected block in response to determining that said block is characterised as: (i) representing a graphic object; and (ii) representing a static image component.

The block identifier may further comprise a false-alarm detector configured to perform a large-area protection test to determine whether the candidate blocks cover a frame area indicative of an error in the characterisation of the blocks, and, if so, to determine the candidate blocks are not protected blocks; and, if not, identify the candidate blocks as protected blocks.

The large-area protection test may comprise: i) determining a candidate region of the first frame in dependence on the candidate blocks; ii) performing an eroding operation on the candidate region using an erosion kernel; and iii) determining that the candidate blocks cover a frame area indicative of an error if not all of the candidate region is eroded by the eroding operation and determining that the candidate blocks do not cover a frame area indicative of an error if all of the candidate region is eroded by the eroding operation.

The false-alarm detector may be configured to determine the candidate region by setting a flag over a block region for each block region that encompasses a candidate block.

The eroding operation may comprise applying the eroding kernel to a block region of the first frame and eroding any part of the candidate region within the block region only if there exists within the eroding kernel blocks that do not form part of the candidate region when the kernel is applied.

There may be provided a method of identifying blocks of a frame of a video sequence to be excluded from a motion-compensated operation, the method comprising: processing pixel values of a first frame to characterise blocks of one or more pixels of the first frame as representing at least a portion of a graphic object; determining difference values between blocks of the first frame and corresponding blocks of a second frame; processing said difference values to characterise blocks of the first frame as representing an image component that is static between the first and second frames; identifying blocks of the first frame as protected blocks in dependence on blocks characterised as: (i) representing at least a portion of a graphic object; and (ii) representing an image component that is static between the first and second frames, wherein the identified protected blocks are to be excluded from the motion compensated operation.

The method may comprise generating a protective key signal that identifies the protected blocks to be protected from the motion compensation operation.

The method may comprise performing the motion compensated operation on the first frame using motion vectors for blocks of the first frame generated by a motion estimator, the motion compensated operation being performed on on non-protected blocks of the first frame and the method comprising excluding the protected blocks of the first frame from the motion-compensated operation.

The method may comprise forcing values of protected blocks to a non-motion compensated blend.

The method may comprise performing a filtering stage on the first frame to enhance image features having characteristics indicative of a graphic object.

The method may comprise performing a filtering stage on the difference values to enhance image features depicted by the difference values having characteristics indicative of a graphic object.

The method may comprise generating a first score for each block of the first frame indicative of a confidence level that said block represents at least a portion of the graphic object.

The method may comprise, for each block of the first frame, characterising the block as representing at least a portion of the graphic object in dependence on a comparison of the first score with a first threshold value.

The method may comprise performing a dilation operation using a dilating kernel, the dilation operation comprising applying the dilating kernel to blocks with a first score indicative of a high confidence level. Blocks with a high confidence level may be determined from a comparison of the first score of the first block with a second threshold value. The dilation operation may comprise characterising each block within the dilating kernel as representing the graphic object.

The method may comprise generating a second score for each block of the first frame indicative of a confidence level that said block represents a static image component.

The method may comprise, for each block of the first frame, characterising the block as not representing a static image component in dependence on a comparison of the second score for that block with a third threshold value.

The method may comprise performing a dilation operation using a dilating kernel, the dilation operation comprising applying the dilating kernel to blocks with a second score indicative of a low confidence level. The dilation operation may comprise characterising each block within the dilating kernel as not representing a static image component.

The method may comprise determining the blocks characterised as representing a static image component from the blocks characterised as not representing a static image component.

The method may comprise, for each block of the first frame, identifying the block as a candidate protected block in response to determining that said block is characterised as: (i) representing a graphic object; and (ii) representing a static image component.

The method may comprise performing a large-area protection test to determine whether the candidate blocks cover a frame area indicative of an error in the characterisation of the blocks, and, if so, to determining the candidate blocks are not protected blocks; and, if not, identifying the candidate blocks as protected blocks.

The large-area protection test may comprise: i) determining a candidate region of the first frame in dependence on the candidate blocks; ii) performing an eroding operation on the candidate region using an erosion kernel; and iii) determining that the candidate blocks cover a frame area indicative of an error if not all of the candidate region is eroded by the eroding operation and determining that the candidate blocks do not cover a frame area indicative of an error if all of the candidate region is eroded by the eroding operation.

The method may comprise determining the candidate region by setting a flag over a block region for each block region that encompasses a candidate block.

The eroding operation may comprise applying the eroding kernel to a block region of the first frame and eroding any part of the candidate region within the block region only if there exists within the eroding kernel blocks that do not form part of the candidate region when the kernel is applied.

The processor units according to the examples herein may be embodied in hardware on an integrated circuit.

There may be provided a method of manufacturing, using an integrated circuit manufacturing system, a processor unit according to the examples herein.

There may be provided a method of manufacturing, using an integrated circuit manufacturing system, a processor unit according to the examples described herein, the method comprising:

processing, using a layout processing system, a computer readable description of the graphics processing system so as to generate a circuit layout description of an integrated circuit embodying the processor unit; and manufacturing, using an integrated circuit generation system, the processor unit according to the circuit layout description.

There may be provided computer program code for performing any of the methods described herein.

There may be provided a non-transitory computer readable storage medium having stored thereon computer readable instructions that, when executed at a computer system, cause the computer system to perform any of the methods described herein.

There may be provided an integrated circuit definition dataset that, when processed in an integrated circuit manufacturing system, configures the integrated circuit manufacturing system to manufacture a processing unit as described herein.

There may be provided a non-transitory computer readable storage medium having stored thereon a computer readable description of a processing unit according to any of the examples herein that, when processed in an integrated circuit manufacturing system, causes the integrated circuit manufacturing system to manufacture an integrated circuit embodying the processor unit.

There may be provided a computer readable storage medium having stored thereon a computer readable description of a processor unit according to any of the examples herein which, when processed in an integrated circuit manufacturing system, causes the integrated circuit manufacturing system to:

process, using a layout processing system, the computer readable description of the processor unit so as to generate a circuit layout description of an integrated circuit embodying the processor unit; and manufacture, using an integrated circuit generation system, the processor unit according to the circuit layout description.

There may be provided an integrated circuit manufacturing system configured to manufacture a processor unit according to any of the examples herein.

There may be provided an integrated circuit manufacturing system comprising:

a non-transitory computer readable storage medium having stored thereon a computer readable description of a processor unit according to any of the examples herein;

a layout processing system configured to process the computer readable description so as to generate a circuit layout description of an integrated circuit embodying the processor unit; and an integrated circuit generation system configured to manufacture the processor unit according to the circuit layout description.

BRIEF DESCRIPTION OF THE DRAWINGS

The present invention will now be described by way of example with reference to the accompanying drawings. In the drawings.

Figure 1:
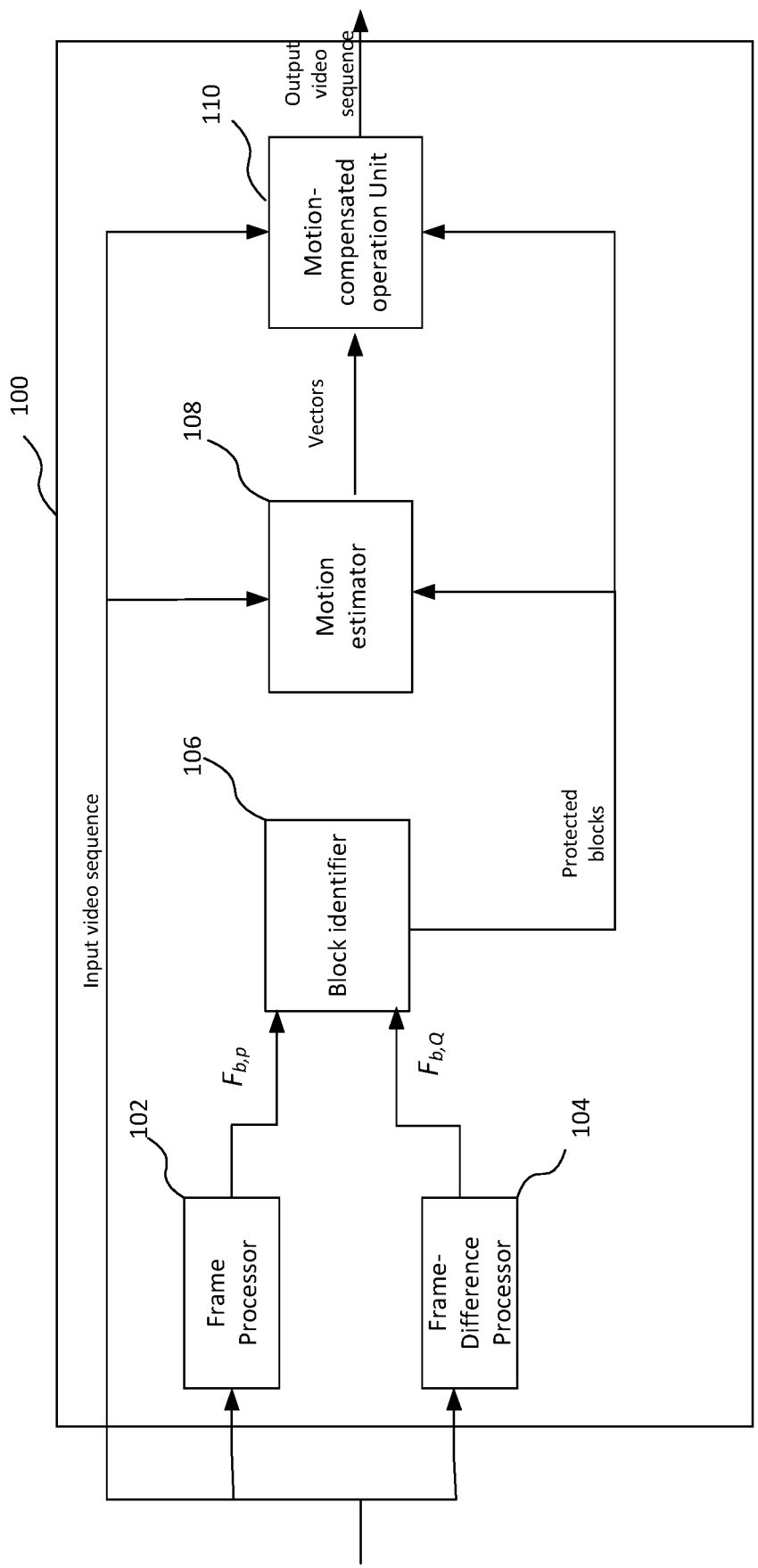
FIG. 1 shows a schematic illustration of a motion compensated process unit for protecting regions of an image from a motion-compensated operation.

Common reference numerals are used, where appropriate, to indicate common or similar features.

DETAILED DESCRIPTION

The following description is presented by way of example to enable any person skilled in the art to make and use the invention. The present invention is not limited to the embodiments described herein and various modifications to the disclosed embodiments will be readily apparent to those skilled in the art.

As described above, there may exist within a region of a depicted image graphic objects that are static between successive frames, or indeed between a plurality of successive frames, of a video sequence. The graphic objects may be a type of on-screen graphic, or a digital on-screen graphic (DOG). They may be objects that form part of the displayed image when the frame is played as part of the video sequence, but are not actually part of the scene being depicted by the frame. A graphic object could be a watermark. The graphic objects may alternatively be referred to as graphical elements. These graphical elements may be broadcaster or channel logos, scoreboards, subtitles, alphanumeric characters, symbols, static text etc. If the video sequence is subject to a frame rate conversion, the interpolated frames generated for inclusion within the sequence may contain conversion artefacts in the regions that depict the static graphic objects, for example because such regions have incorrectly been subjected to motion compensation to generate the interpolated frame. The examples described herein are directed to identifying regions of a frame that represent these static graphic objects and optionally excluding such regions from a motion compensated operation when generating an interpolated frame.

Figure 11:
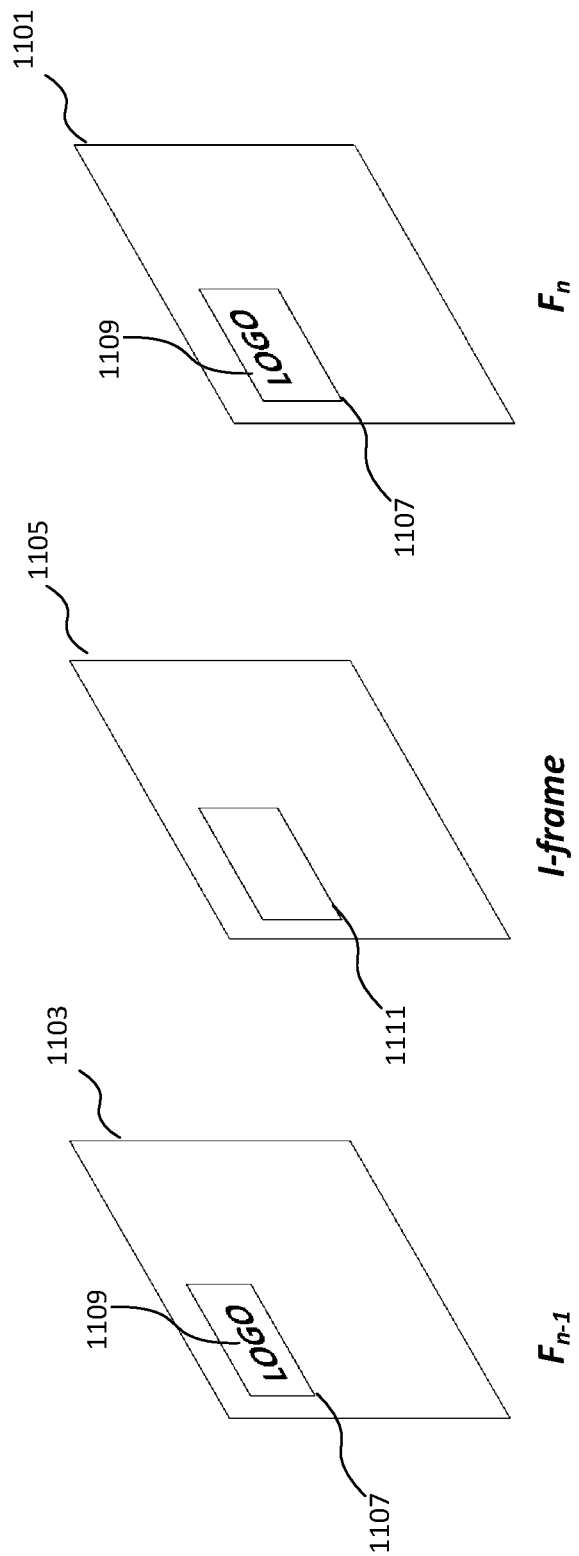
FIG. 11 is a schematic diagram illustrating an interpolated frame included between first and second frames of a video sequence.

An overview of this process is illustrated with respect to FIG. 11, which shows a first frame $F_n$ (denoted 1101) and a second frame $F_{n-1}$ (denoted 1103) of a video sequence and an interpolated frame 1105 that is generated for inclusion within the sequence (e.g. as part of a frame-rate conversion). The frames $F_n$ and $F_{n-1}$ contain a region 1107 that depicts a graphical element 1109 that is static between the frames. In this example the graphical element is an on-screen graphic depicting a logo (e.g. a broadcaster's logo).

In order to identify the region of the frame $F_n$ that contains the on-screen graphic 1109, blocks of one or more pixels in the first frame $F_n$ are processed to identify blocks that can be characterised as representing a graphic object. As used herein, a "block" refers to one or more pixels. If a block refers to multiple pixels, the pixels forming that block may be contiguous with each other. As used herein, "representing a graphic object" may mean that the block depicts, or represents, a whole or a part of the graphic object. For example, if the graphic object were an alphanumeric character, a block that depicts at least a part, or component, of the character may be said to represent the graphic object. In this example, this step would identify the blocks of the frame $F_n$ within the region 1107.

In addition, difference values between blocks of the frame $F_n$ and corresponding blocks of the second frame $F_{n-1}$ are determined and then processed to identify blocks of the first frame $F_n$ that can be characterised as representing a static image component (or parts thereof). That is, difference values are processed to identify components that are static between the first and second frames. An image component may refer to any part or component of a depicted image. It may refer to an object or element forming part of the depicted image. In the example shown in FIG. 11, this step would identify that blocks within the frame region 1107 represent a portion of the image that is static with respect to the frame $F_{n-1}$.

Blocks that are characterised as representing both a graphic object and a static image component are used to determine protected blocks of the frame. These protected blocks may be excluded from motion estimation and/or subsequent motion compensation when the frame is processed during frame rate conversion in order to protect those blocks from conversion errors. Blocks that are not identified as protected blocks may be subject to motion compensation during frame rate conversion. Referring back to the example, blocks within the frame region 1107 have been characterised from the two processing steps as both representing a graphical object, or element, and also as representing a portion of the image that is static between the frames $F_{n-1}$ and $F_n$. Thus, those blocks are protected from motion compensation when generating the interpolated frame 1105. The values of the blocks 1111 of the interpolated frame corresponding to the protected blocks may be determined in some other manner, e.g. by pixel replication or a non-motion compensated blend.

The following description describes in more detail examples of how on-screen graphic objects depicted in a frame can be identified and protected from conversion errors and artefacts. These examples describe the detection of the graphic objects within a single frame of a sequence (e.g. a sequence that is to undergo frame rate conversion). This is for the purposes of illustration only and it will be readily appreciated that each frame of a sequence may be processed in a similar way.

FIG. 1 shows a schematic illustration of a processor unit 100 configured to perform a motion compensated process on a sequence of video frames. The unit 100 comprises a frame processor 102, a frame-difference processor 104 a block identifier 106, a motion estimator 108 and a motion-compensated operation unit 110. Though in this example the motion estimator is shown as being an internal component of the processor unit 100, in other examples it may be a separate component not forming part of the unit 100.

The motion-compensated operation unit 110 is configured to perform a motion-compensated operation and could be, for example, a motion-compensated interpolator for generating interpolated frames, e.g. for use within a frame rate converter (FRC). Thus, in some examples the unit 100 may form part of a frame rate converter (not shown). The unit 110 may perform the motion-compensated operation using motion vectors generated by the motion estimator 108. The motion estimator 108 may generate motion vectors for blocks of the frame. These blocks may be referred to herein as motion estimation blocks. The block identifier 106 is configured to identify protected blocks within a frame that are to be excluded from the motion-compensated operation performed by the unit 110. It is noted that the motion estimation blocks and protected blocks might be the same size and/or shape as each other, but could be different sizes and/or shapes to each other.

The unit 100 receives as an input a video sequence that comprises a first frame and a second frame. The first and second frames may be existing frames of a sequence that is to undergo frame rate conversion. The first frame (denoted $F_n$) is received at an input of the frame processor 102 and at an input of the frame-difference processor 104. The second frame is also received at the input of the frame-difference processor. In the examples described herein the second frame is the frame that precedes the first frame of a sequence and is denoted $F_{n-1}$. This is an example only, and the second frame may alternatively be a frame that succeeds the first frame (e.g. $F_{n+1}$). Further, the second frame need not be immediately adjacent to the first frame in the sequence. That is, the first and second frames may be separated by one or more intervening frames of the sequence.

The output of the frame processor 102 is coupled to a first input of the block identifier 106. The output of the frame-difference processor 104 is coupled to a second input of the block identifier 106. An output of the block identifier 106 is coupled to an input of the motion-compensated operation unit 110 and optionally the motion estimator 108, though in some examples the output of block identifier 106 is coupled only to the unit 110 and not to the motion estimator 108. This is explained in more detail below.

Figure 2:
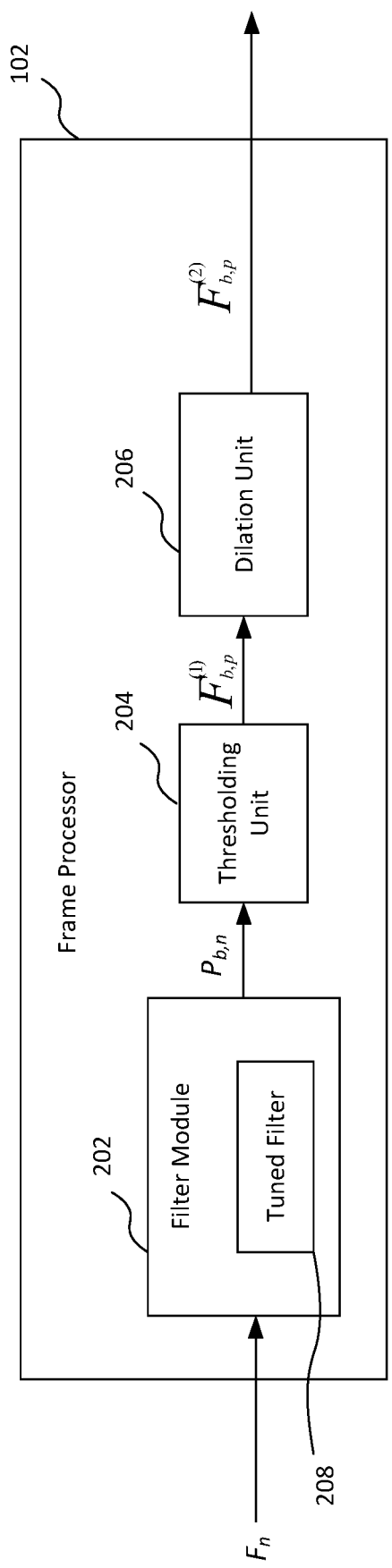
FIG. 2 shows an example of the frame processor of motion compensated process unit.

An example of the frame processor 102 is shown in FIG. 2. In this example the frame processor comprises a filter module 202 (which comprises a tuned filter 208), a thresholding unit 204 and a dilation unit 206. In this example the frame processor is arranged so that an output of the filter module is coupled to an input of the thresholding unit 204, and an output of the thresholding unit 204 is coupled to an input of the dilation unit 206. In other examples the frame processor may not comprise the thresholding unit and/or the dilation unit and/or the tuned filter. The units may be coupled together directly, or via one or more intermediary components.

Figure 3:
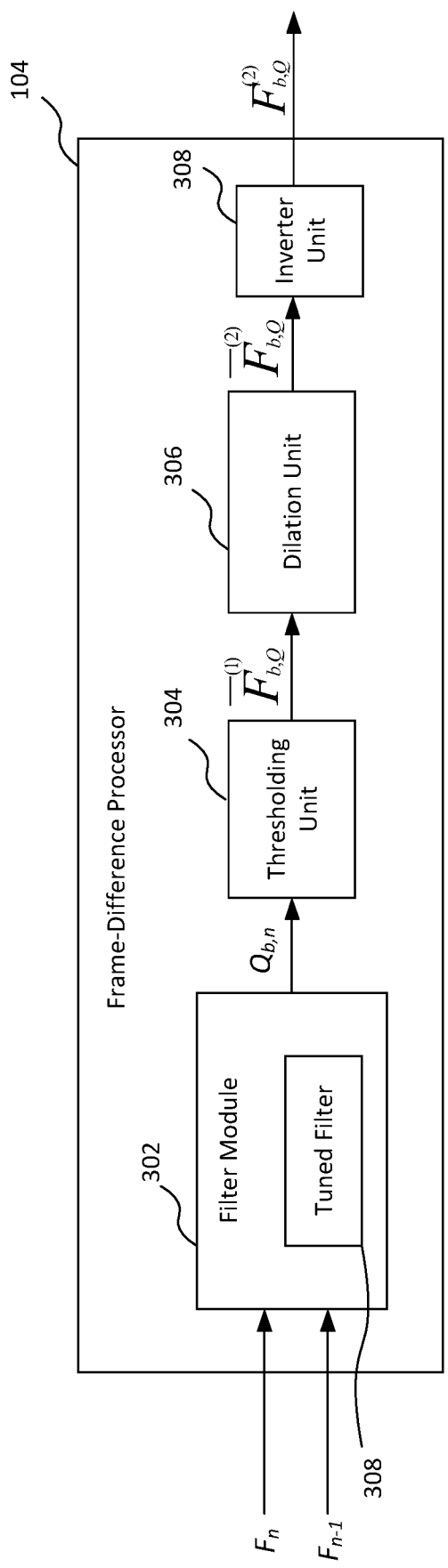
FIG. 3 shows an example of the frame-difference processor of the motion compensated process unit.

An example of the frame-difference processor 104 is shown in FIG. 3. In this example the frame-difference processor is similar in layout to the frame processor 102 and comprises a filter module 302 (which comprises a tuned filter 308), a thresholding unit 304 and a dilation unit 306. The processor further comprises an inverter unit 308. An output of the filter module 302 is coupled to an input of the thresholding unit 304, and an output of the thresholding unit is coupled to the input of the dilation unit 306. An output of the dilation unit is coupled to an input of the inverter unit. In other examples the frame-difference processor may not comprise the thresholding unit 304 and/or the dilation unit 306 and/or the tuned filter 308.

Figure 4:
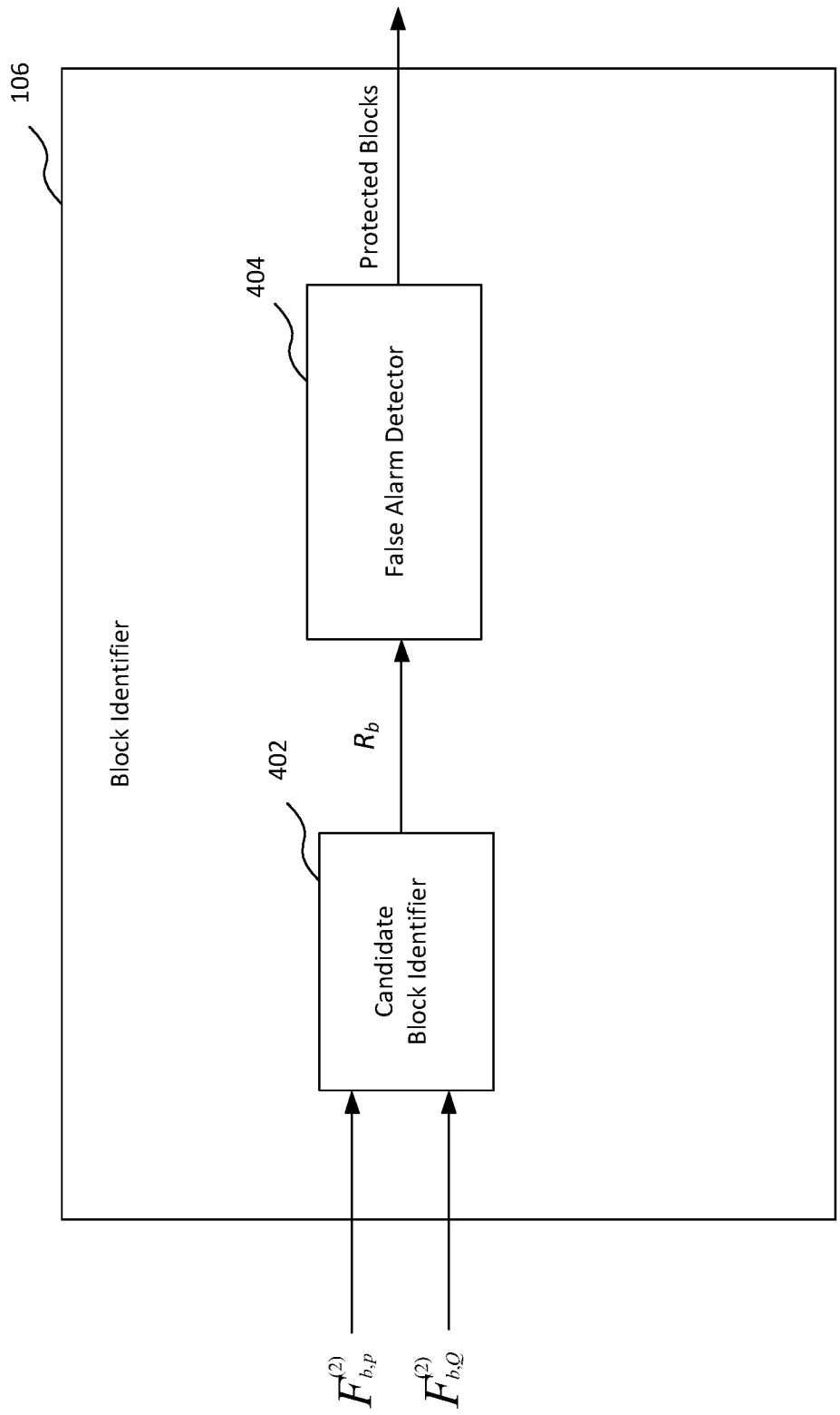
FIG. 4 shows an example of the block identifier of the motion compensated process unit.

An example of the block identifier 106 is shown in FIG. 4. In this example the block identifier comprises a candidate block identifier 402 and a false-alarm detector 404. The block identifier is arranged so that an output of the candidate block identifier is coupled to an input of the false alarm detector 404. The components may be coupled together directly (as shown) or via one or more other intermediary components.

Figure 5:
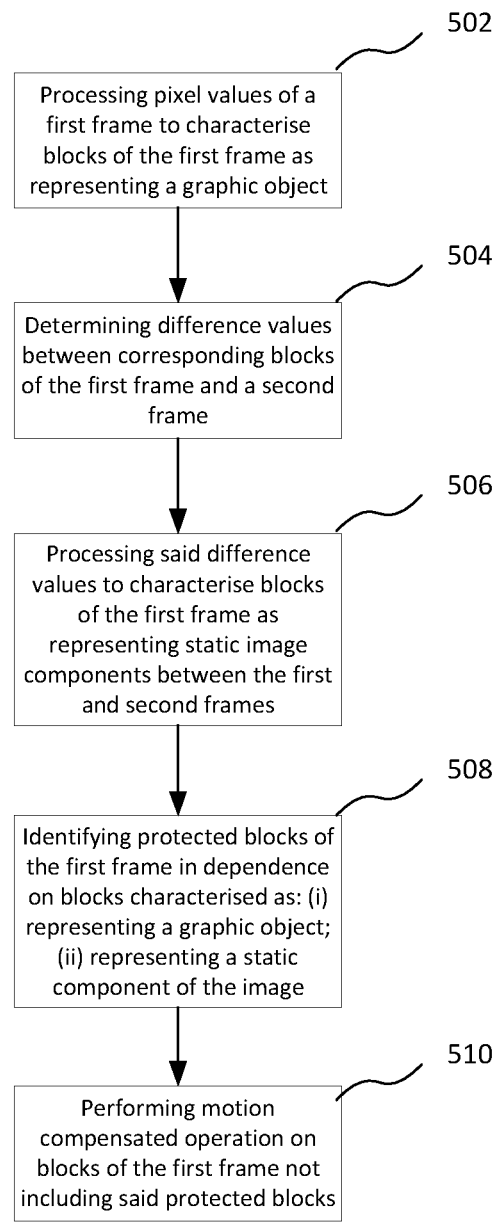
FIG. 5 shows a flowchart of the steps for identifying regions of an image to be protected from a motion-compensated operation.

The operation of the processor unit 100 will now be described with reference to the flow chart shown in FIG. 5. The following description describes the operation of the processor unit 100 to perform motion compensated interpolation for a single frame.

This is for the purposes of illustration only and it will be appreciated that the processor unit may be configured to perform motion compensated interpolation on a number of frames of a sequence.

As described above, the frame processor 102 receives at its input a first frame $F_n$, and the frame-difference processor receives at its input the first frame $F_n$ and a second frame $F_{n-1}$, where $F_{n-1}$ is the preceding frame of the sequence. At step 502 the frame processor 102 processes the pixel values of the first frame to characterise blocks of the first frame as representing a graphic object. As used herein, a "block" refers to one or more pixels. The one or more pixels of a block may be contiguous so that a block contains n by m pixels, where n=m or n≠m. In the following, a block contains only a single pixel for the purpose of clarity. As described above, a graphic object may be a feature or component of the image that remains stationary between successive frames of the video sequence. It could be an on-screen graphic, or digital on-screen graphic. The graphic object may be in the form of or contain one or more graphical symbols, e.g. alphanumeric text or logos. Graphic objects may be one or more of broadcaster logos, subtitles, scoreboards, static text, credits etc.

The frame processor 102 may process the pixel values of the first frame to determine a confidence level that blocks of the first frame represent a graphic object or a part thereof. A block may be characterised as representing a graphic object if the confidence level is above a threshold. As part of processing the first frame, the frame processor 102 may perform filtering operations on the first frame to identify where within the frame the graphic objects are depicted. In this example, the filter module 202 of the frame processor performs a filtering stage on the first frame to enhance image features depicted by the frame that have characteristics that are indicative, or suggestive, of the image feature being a graphical object. A filtering stage may comprise one or more filtering operations.

It has been realised that graphical objects in the form of alphanumeric symbols may have a characteristic width, or spacing. That is, the inter-edge spacing of alphanumeric symbols along the horizontal direction may typically be approximately constant across a word or logo. As such, the filter module 202 may filter the images in order to enhance the edges of image features that have an inter-edge spacing indicative of a graphical object. The filter module 202 may perform this filtering operation using a comb filter. The specific values of the filter may depend upon the word or logo that the frame processor is attempting to identify, and as such may depend on the input video sequence. The values of the filter may depend on for example the expected size of the graphical object (and hence the expected inter-edge spacing of the symbols forming the graphical object). The filter module 202 may as such comprise a filter 208 (e.g. a horizontal comb filter) that is configured to detect the edges of image features having an inter-edge spacing indicative of an expected graphical object. The filter 208 may be programmable, or tunable, so that the processor unit 100 can be used to detect a variety of graphical objects depicted within frames. Alternatively the frame processor 102 may comprise a plurality of filters each being tuned to detect graphical symbols of different sizes and/or shapes and configurations.

The filter module 202 may be configured to output a score for blocks of the first frame that is indicative of a confidence level that the blocks represent a graphical object. The score may be a numerical value. In one possible implementation the filter module 202 outputs a score $P_{b,n}$ for each block 'b' of the frame $F_n$. If per-block values are stored in 8-bits, the score may be a value between 0 and 255. The score could be a luma value associated with the block after the block has been filtered. As a simple example, the score for each block may be equal to or directly derived from the luma value of the block such as a scaled value. The score may be equal to or directly derived from the filtered luma values (i.e. the luma value of the block after the block has undergone the filtering stage). Alternatively, the score associated with a block of the frame $F_n$ may depend on the filtered luma value of that block and the filtered luma value of corresponding blocks of preceding frames in the sequence. In this case the filter module 202 may comprise a temporally recursive filter (not shown in FIG. 2) that outputs a score for each block of the frame $F_n$ that is a weighted sum of the filtered luma value of that block of frame $F_n$ and the score associated with a corresponding block of a previous frame in the sequence. That is, if the filtered luma value associated with a block b of the frame $F_n$ is given by $\tilde{Y}_{b,n}$, the score $P_{b,n}$ for that block may be given by:

$$P_{b,n} = w_1 \tilde{Y}_{b,n} + w_2 P_{b,n-1} \quad (1)$$

Here $w_1$ and $w_2$ represent weightings and $P_{b,n-1}$ represents the score for the corresponding block of the previous frame. The values of the weightings $w_1$ and $w_2$ determine the relative weighting of the present filtered luma value to previous filtered luma values of corresponding blocks when calculating the score for a block of the present frame $F_n$. The values of the weightings $w_1$ and $w_2$ may be implementation specific, but may nevertheless be scaled so that they sum to one. Using a temporally recursive filter to generate the scores for each block of the frame may result in a more reliable confidence measure for that block. This is because the graphical objects that the frame processor is attempting to identify are typically present in a plurality of successive frames in the sequence. The temporally recursive filter takes advantage of this observation by outputting a score which is dependent on the history of the scores for corresponding blocks of preceding frames.

The filter module 102 processes the scores $P_{b,n}$ for the blocks of the frame $F_n$ to characterise the blocks as representing the graphic objects. It can be seen that by filtering the first frame $F_n$ to enhance image features having characteristics indicative of the graphical object, a score indicative of, or derived from the filtered luma values of the blocks of the frame $F_n$ can be used to convey a degree of confidence that the block represents a graphic object. In one example, the thresholding unit 204 receives the block scores $P_{b,n}$ output from the filtering module 202, compares each score against a predetermined value and characterises a block as representing the graphic object in dependence on the comparison of the score with the predetermined value. If the scores are indicative of a confidence level that the blocks represent a graphical object, the thresholding unit may characterise blocks that have scores greater than the predetermined value as representing graphic objects. The thresholding unit may characterise a block as representing a graphic object by setting a flag for that block. These flags are denoted in FIG. 2 by $F_{b,p}^{(1)}$, where the 'b' denotes the block for which the flag is set, 'p' denotes that the flag is set in dependence on a block score P and (1) denotes that the flags are a first iteration of flags (which will be explained in more detail below).

Figure 6:
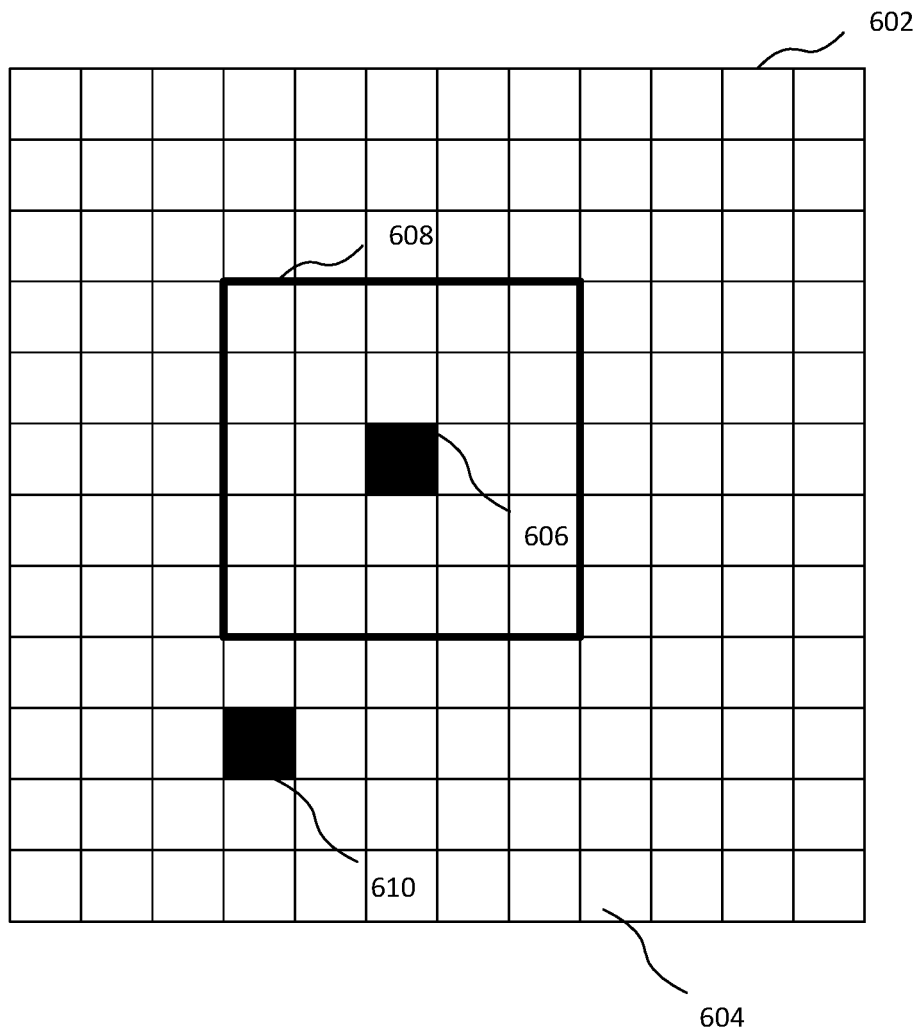
FIG. 6 shows an illustration of a dilate operation to characterise blocks as representing a graphic component and/or a static image component.

The frame processor 102 may be further configured to characterise blocks as representing the graphic object that are within a vicinity, or locality, of a block that has been characterised as a graphic object in dependence on a comparison of its score with a threshold value. That is, once the thresholding unit 204 has characterised blocks of the frame $F_n$ as representing a graphic object by setting flags for those blocks, each block within a set vicinity of each characterised block may also be characterised as representing a graphic object (e.g. by setting flags for each of those blocks). This is illustrated with reference to FIG. 6, which shows frame $F_n$ (denoted 602) comprising a plurality of blocks b (denoted generally at 604). In this example, block 606 has been characterised as representing a graphic object by the thresholding unit based on a comparison of its score with a threshold value. Consequently, each block within the vicinity 608 of block 606 is also characterised as representing a graphic object. This processing step may be performed by the dilation unit 206, which may operate to increase the number of blocks within the frame $F_n$ characterised as representing the graphic object. The flags set by the dilation unit are denoted $F_{b,p}^{(2)}$, where the (2) denotes that the flags are a second iteration of flags set during a dilation operation rather than the thresholding operation performed by thresholding unit 204.

The thresholding unit 204 may be configured to compare the block scores against one or more predetermined values, which may be referred to as threshold values. If the score is compared against a plurality of values, each of the plurality of threshold values may indicate different levels of confidence that the block represents a graphic object. That is, the plurality of threshold values may define a set of confidence bands. The thresholding unit may then place a block score into one of the confidence bands that indicates a level of confidence that that block represents a graphic object. The bands may be defined so that the higher the values of the scores defining a band, the higher the confidence level of that band (i.e. the more likely it is a given block with a score within the band represents a graphic object).

The dilation unit 206 may be configured so that only blocks within the vicinity of a block with a score indicative of a high confidence level are characterised as also representing the graphic object. That is, if a block has a score indicative of a relatively low confidence level based on a comparison of its score with a first threshold value (e.g. block 610 in FIG. 6), then that block may be characterised as representing a graphic object but other blocks within its vicinity will not be. If on the other hand a block has a score indicative of a relatively high confidence level based on a comparison of its score with a second threshold value (e.g. block 606), then that block may be characterised by the thresholding unit as representing a graphic object and the dilation unit 206 further characterises blocks within its vicinity as also representing the graphic object. The 'vicinity' may be a fixed-size area (e.g. a fixed-size area of blocks). The vicinity may be a fixed range (e.g. of blocks) along the horizontal and/or vertical direction. In one specific example, the dilation unit may be configured to characterise as representing at least a portion of a graphic object each block that is within a range of ±10 pixels along the horizontal direction and ±5 pixels along the vertical direction of a high-confidence block. Alternatively, the vicinity may not be a fixed-size area but could be a variably-sized area. The dilation unit 206 might for example set of the size of the vicinity around a block in dependence on the score for that block. The size of the vicinity may vary in proportion to the confidence level that the block represents a graphical object. In other words, the dilation unit 206 might set a relatively larger vicinity when the block score indicates a relatively high confidence level that the block represents a graphical object, and a relatively smaller vicinity when the block score indicates a relatively low confidence level that the block represents a graphical object.

In other words, the dilation unit 206 can be said to perform a dilating operation using a dilating kernel in which the dilating kernel is applied to blocks of the frame $F_n$ with a score $P_{b,n}$ indicative of a high confidence level that that block represents a graphic object. A score indicative of a high confidence level may be one that is greater than a predetermined threshold. As part of the dilating operation each block within the dilating kernel is characterised as representing a graphic object. In the example shown in FIG. 6, the dilating kernel as applied to block 606 is equal to the vicinity 608.

The flags $F_{b,p}^{(1)}$ set by the thresholding unit 204 may be a simple 1-bit/binary flag indicating either that a block is characterised as representing a graphic object or characterised as not representing a graphic object. Alternatively, if the threshold unit 204 can compare the block scores against a plurality of threshold values it may set an n-bit flag that indicates which confidence band the block associated with the block score falls within. For example, a 2-bit flag would enable the thresholding unit to define the state of the block in four possible ways, e.g.: (i) as not representing a graphical object; (ii) representing a graphical object with a first confidence level (e.g. score greater than a first threshold); (iii) representing the graphical object with a second confidence level greater than the first (e.g. score greater than a second threshold); and (iv) representing the graphical object with a third confidence level greater than the second (score greater than a third threshold). The dilation unit 206 may be configured to process the n-bit flags from the threshold unit to determine what blocks to apply the dilating operation to. For example, the dilation unit 206 might apply the dilating operation only to blocks with a confidence level greater than a specified threshold value. If the dilation unit 206 can apply a variable-sized dilating kernel, then the unit 206 might set the size of the dilating kernel for a block in dependence on the confidence level for the block specified by its n-bit flag (e.g. by setting the size of the kernel in proportion to the confidence level for the block).

The flags $F_{b,p}^{(2)}$ set by the dilation unit 206 during the dilating operation may be 1-bit flags.

Referring back to FIG. 5, at step 504 the frame-difference processor 104 receives the frame $F_n$ and the preceding frame $F_{n-1}$ and calculates difference values between corresponding blocks of the frames. A pair of blocks may be corresponding blocks if they occupy the same position with respect to frames $F_n$ and $F_{n-1}$ (i.e. they have the same pixel coordinates). A difference value may be calculated for each block of the frame $F_n$. That is, although the difference value is calculated using (in part) the frame $F_{n-1}$, the difference value is associated with the blocks of the frame $F_n$. The difference value is indicative of the difference in pixel values between corresponding blocks of the frames. It may be calculated in dependence on the difference in intensity values between the frames. For example, the difference value for a block 'b' of frame $F_n$ may be calculated by subtracting the luma value for that block from the luma value for the corresponding block in the frame $F_{n-1}$, or vice versa. If a block is equal to a single pixel, the luma value for a block is equal to the luma value for that pixel. For cases where a block comprises a plurality of pixels, the luma value for the block might be calculated as the sum, or average, of the luma values for each pixel within the block. Alternatively, the difference value for a block 'b' of frame $F_n$ may be calculated as the sum of absolute pixel luma differences for each pixel of the block.

It will be appreciated that other ways of calculating the difference value are possible. The difference value may be a numerical value in the range 0 to 255 (if for example the difference values are stored in 8-bits).

At step 506 the frame-difference processor processes the difference values to characterise blocks of the first frame $F_n$ as representing static image components (i.e. components of the image that are static between the first and second frames). The frame-difference processor may process the difference values to determine a confidence level that blocks of the frame $F_n$ represent a static image component or part thereof. As part of processing the difference values, the frame-difference processor 104 may perform filtering operations that are analogous to the filtering operations performed by the frame processor 102. That is, the frame difference processor may comprise a filter module 302 that performs a filtering stage to enhance image features represented by the difference values having characteristics indicative of the image feature being a graphical object. The filter module 302 may as such comprise a filter 308 that is configured to detect edges of image features having an inter-edge spacing indicative of the image features being a graphical object. The filter module 302 and filter 308 may perform the same processing steps on the difference values as the module 202 and filter 208 do on the pixel values of the frame $F_n$. This may advantageously reduce the computational burden on the processor by effectively eliminating regions of the image by filtering out those components that, due to their characteristics, are unlikely to be graphical objects.

Filter module 302 may be configured to output a score $Q_{b,n}$ for each block b of the frame $F_n$ that is indicative of a confidence level that the blocks represent a static image component, or part thereof. The score $Q_{b,n}$ for block b of frame n is separate from the score $P_{b,n}$ for that block calculated by the filter module 202. The scores $Q_{b,n}$ may however be calculated in an analogous manner to the scores $P_{b,n}$. The scores $Q_{b,n}$ may be equal to, or directly derivable from, the difference values. They may alternatively be equal to the filtered difference values (i.e. the value of the difference values once those values have been subject to the filtering stage). In yet another example, the scores $Q_{b,n}$ may depend on the filtered difference value for the block b and the filtered difference value for corresponding blocks of preceding frames in the sequence. The score may for example be calculated according to the following equation:

$$Q_{b,n} = w_3|D_{b,n}| + w_4 Q_{b,n-1} \quad (2)$$

where $D_{b,n}$ represents the filtered difference value for block b of frame $F_n$; $Q_{b,n-1}$ represents the score for the corresponding block of the preceding frame $F_{n-1}$ and $w_3$ and $w_4$ are weighting factors. This recursive score may be calculated by a temporally recursive filter (not shown in FIG. 3) that forms part of the filter module 302 and is configured to receive as inputs the difference values and scores $Q_{b,n}$.

The frame difference processor 104 processes the scores $Q_{b,n}$ associated with the blocks of the frame $F_n$ to characterise the blocks as representing a static image component. In one example the thresholding unit 304 receives the scores $Q_{b,n}$ from the filtering module 302, compares each score against a predetermined value and characterises a block as representing a static image component in dependence on the comparison of its score with the predetermined value.

If the Q scores are determined from the difference in pixel values (e.g. intensity values) between corresponding blocks of the frames $F_n$ and $F_{n-1}$, then it can be seen that, in contrast to the P scores, a lower score may denote a higher confidence level that a block represents a static image component whereas a higher score may denote a lower confidence level that a block represents a static image component (e.g. for the case of a perfectly static component, the pixel difference values between corresponding blocks may be 0). This may be alternatively expressed by saying that a higher Q score denotes a higher confidence level that a block does not represent a static image component. Thus the thresholding unit 304 may characterise a block as representing a static image component (e.g. if its Q score is less than a predetermined value), or alternatively it may characterise a block as not representing a static image component (e.g. if its Q score is greater than the predetermined value). In the former case, the remaining blocks (i.e. those blocks that are not characterised as not representing a static image component) are characterised by the frame-difference processor as representing the static image component. That is, the frame-difference processor 102 may operate to process the difference values to characterise blocks of the frame $F_n$ as not representing a static image component, and to then characterise the remaining blocks of the frame as representing a static image component. This will be explained in more detail below.

In this example, the thresholding unit 304 is configured to characterise blocks as not representing a static component by setting flags for those blocks in dependence on a comparison of their scores with the predetermined value. These flags are denoted in FIG. 3 by $\overline{F}_{b,Q}^{(1)}$, where 'b' represents the block of the frame $F_n$ to which the score is associated; Q denotes that the flag is set in dependence on the Q score and the superscript (1) denotes that the flags are first iteration flags. The flags $\overline{F}_{b,Q}^{(1)}$ are independent of the flags $F_{b,P}^{(1)}$ set by the thresholding unit 202. That is, a given block b may have both flags $\overline{F}_{b,Q}^{(1)}$ and $F_{b,P}^{(1)}$ set, one of these flags set, or neither of these flags set.

The frame-difference processor 104 may be further configured to characterise blocks that are within a vicinity of a block that has been characterised as not representing a static image component. Such blocks may be also characterised as not representing a static image component. For example, returning again to FIG. 6, if block 606 has been characterised by the thresholding unit 304 as not representing a static image component, then each block within the vicinity 608 of block 606 may also be characterised as not representing a static image component. This processing step may be performed by dilation unit 306, which may receive the flags set by thresholding unit 304.

Similarly to thresholding unit 204, thresholding unit 304 may be configured to compare the Q scores against a plurality of predetermined values. The different threshold values indicate different levels of confidence that the block represents a static image component. Thus the threshold values may define a set of confidence bands that each indicate a level of confidence that a block represents a static image component. The bands may be defined so that the higher the values of the scores defining a band, the lower the confidence level of that band (i.e. the less likely it is that a given block with a score $Q_{b,n}$ within that band represents a static image component), and vice versa. The dilation unit 306 may be configured so that only blocks within the vicinity of a block with a score $Q_{b,n}$ indicative of a low confidence level (e.g. with scores above a threshold value) are also characterised as not representing a static image component. Thus, for example, if a block has a score greater than a first threshold value of the thresholding unit 304, then this may indicate a confidence level sufficiently low that the block is characterised as not representing a static image component, but other blocks in its vicinity are not. If a block has a score greater than a second threshold value of unit 304 (greater than the first threshold value), then this may indicate a very low confidence level so that not only is that block characterised by the thresholding unit as not representing a static image component, but other blocks within its vicinity are characterised by the dilation unit 306 as also not representing a static image component. As mentioned above in relation to the dilation unit 206, the 'vicinity' may be an area of a fixed size (e.g. an m by n region of pixels) or an area of a variable size. The dilation unit 306 might for example set the size of the vicinity around a block in dependence on the score for that block. The size of the vicinity may vary in inverse proportion to the confidence level that the block represents a static image component. In other words, the dilation unit 206 might set a relatively larger vicinity when the block score indicates a relatively low confidence level that the block represents a static image component, and a relatively smaller vicinity when the block score indicates a relatively higher confidence level that the block represents a static image component.

Thus dilation unit 306 can be said to perform a dilating operation using a dilating kernel in which the dilating kernel is applied to blocks of the frame $F_n$ with a score $Q_{b,n}$ indicative of a low confidence level that the block represents a static image component (or equally, with a score $Q_{b,n}$ indicative of a high confidence level that the block does not represent a static image component). This dilating kernel may be the same size as the dilating kernel applied by dilation unit 206 (i.e. it covers an equal number of pixels/blocks). The dilating kernels may also be referred to as structuring elements. The dilation unit 306 may characterise blocks as not representing a static image component by setting a flag $\overline{F}_{b,Q}^{(2)}$ for each block within the dilating kernel as part of the dilation operation. Here, the superscript (2)

denotes that the flags are second iteration flags set during the dilation operation (as opposed to the thresholding operation).

Similarly to the above, the flags $\overline{F}_{b,Q}^{(1)}$ set by the thresholding unit 304 may be 1-bit/binary flags or they may be n-bit flags that indicate what confidence band the block associated with the score $Q_{b,n}$ falls within. The dilation unit 306 may be configured to process the n-bit flags from the threshold unit 304 to determine what blocks to apply the dilation operation to. For example, the dilation unit 306 might apply the dilating operation only to blocks with a confidence level lower than a specified threshold value. If the dilation unit 306 can apply a variable-sized dilating kernel, then the unit 306 might set the size of the dilating kernel for a block in dependence on the confidence level for the block specified by its n-bit flag (e.g. by setting the size of the kernel inversely proportional to the confidence level the block represents a static image component). The flags $\overline{F}_{b,Q}^{(2)}$ set by the dilation unit during the dilation operation may be 1-bit flags.

The inverter unit 308 receives the flags from the dilation unit 308 and inverts each flag; i.e. it sets flags for the blocks of frame $F_n$ that do not have a set flag $\overline{F}_{b,Q}^{(2)}$ and also removes or de-sets the flags $\overline{F}_{b,Q}^{(2)}$ that were set by the dilation unit 306 or thresholding unit 304. The inverter unit 308 may therefore be said to characterise blocks of the frame $F_n$ as representing a static image component that haven't been characterised as not representing a static image component by the thresholding unit 304 or dilation unit 306. Thus, in this example the frame-difference processor 104 determines the blocks of the frame $F_n$ characterised as representing a static image component from (i.e. using) the blocks characterised as not representing a static image component.

Figure 7:
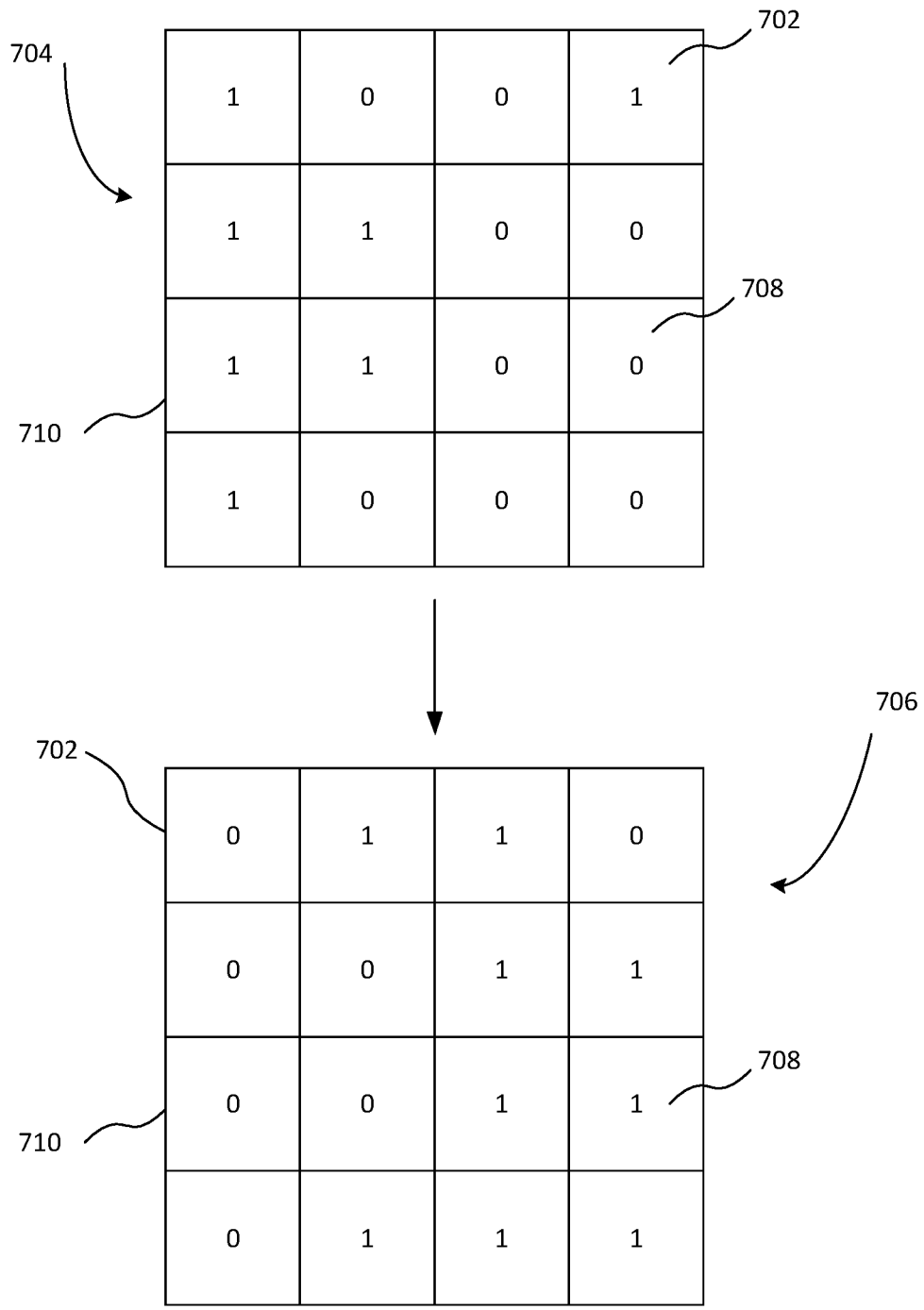
FIG. 7 shows an illustration of flag values for a frame being processed by an inverter unit.

FIG. 7 illustrates the effect of the inverter unit 308, which shows a schematic illustration of the flag values for blocks 702 of frame $F_n$. In this example a value of '1' indicates that a flag has been set for the block and a value of '0' indicates that a flag has not been set. The flag values of the blocks after the frame has been processed by the threshold unit 304 and dilation unit 306, but before being processed by the inverter unit 308, are denoted generally at 704. 704 thus illustrates the flags $\overline{F}_{b,Q}^{(2)}$. The values of the blocks after being processed by the inverter unit 308 are denoted generally at 706. The flags illustrated at 706 are denoted $F_{b,Q}^{(2)}$. The flags $F_{b,Q}^{(2)}$ are related to the flags $\overline{F}_{b,Q}^{(2)}$ by the logical relationship $F_{b,Q}^{(2)} = \text{NOT}(\overline{F}_{b,Q}^{(2)})$.

In this example, a value of '0' within the set of values 704 indicates a block (e.g. block 708) that has not been characterised by the thresholding unit 304 or dilation unit 306 as not representing a static image component. The inverter 308 then operates to set the flag for such blocks to characterise those blocks as representing a static image component (i.e. the flags $F_{b,Q}^{(2)}$ denote blocks of the frame $F_n$ characterised as representing a static image component). Thus, in this example block 708 is characterised by the inverter 308 as representing a static image component. Conversely, a value of '1' within the set of values 704 indicates a block (e.g. block 710) that has been characterised by the thresholding and/or dilation units as not representing a static image component. The inverter 308 then operates to remove the flag for those blocks so that those blocks are not characterised as representing a static image component.

Information on the flags $F_{b,p}^{(2)}$ and $F_{b,Q}^{(2)}$ is sent from the frame processor 102 and frame-difference processor 104 to the block identifier 106.

At step 508, the block identifier 106 identifies protected blocks of the frame $F_n$ in dependence on blocks characterised as: i) representing a graphic object; and ii) representing a static component of the image. Thus, in this example the block identifier 106 identifies protected blocks in dependence on the blocks that have a set flag $F_{b,p}^{(2)}$ and $F_{b,Q}^{(2)}$. The identified protected blocks may then be excluded from motion estimation performed by the motion estimator 108 and/or motion compensated processing (e.g. motion compensated operation performed by unit 110).

To identify the protected blocks, the block identifier 106 may comprise a candidate block-identifier 402 that is configured to identify blocks of the frame $F_n$ as candidate blocks that are characterised as both representing a graphic object and representing a static image component. That is, if a block has set flags $F_{b,p}^{(2)}$ and $F_{b,Q}^{(2)}$ then the candidate block identifier 402 categorises that block as a candidate block. If a block has only one set flag (i.e. the block is characterised as representing a static image component or a graphic object, but not both), then the candidate block identifier 402 determines that that block is not a candidate block. The candidate-block identifier 402 may set a flag $R_b$ for each candidate block of the frame. The candidate-block identifier 402 may therefore operate as a logical AND gate having as inputs $F_{b,p}^{(2)}$ and $F_{b,Q}^{(2)}$.

The candidate-block flags $R_b$ output by the candidate-block identifier 402 are received by the false-alarm detector 404. The false alarm detector 404 operates to perform a large-area protection test to determine whether the candidate blocks cover an area of the frame $F_n$ that indicates an error has been made in the characterization of the blocks. If the area covered by the candidate blocks is too large, this may suggest that an error has been made in identifying those blocks as representing a static graphical object. This is because graphic objects that may need protection from motion compensation artefacts (such as broadcaster logos, subtitles etc.) typically occupy a relatively small, or localized region of the frame. It may also be undesirable to protect large regions of the image from motion compensation because the motion for that region would then fall back to non-smooth motion that frame rate conversion is intended to smooth out. In addition, the boundary between motion compensated and non-motion compensated processed regions can be highly visible if positioned arbitrarily within an image and not coincident with an image feature, e.g. an edge of a logo.

If the area covered by the candidate blocks is sufficiently large, this may indicate that objects in the frame have been incorrectly identified as a static graphic object. If the detector 404 determines that there is an error in the characterization of the blocks, it concludes that the candidate blocks are not protected blocks. The false-alarm detector may therefore operate to prevent large regions of the frame and/or regions of the frame that do not contain a static graphical object from being protected from motion compensation.

Figure 8:
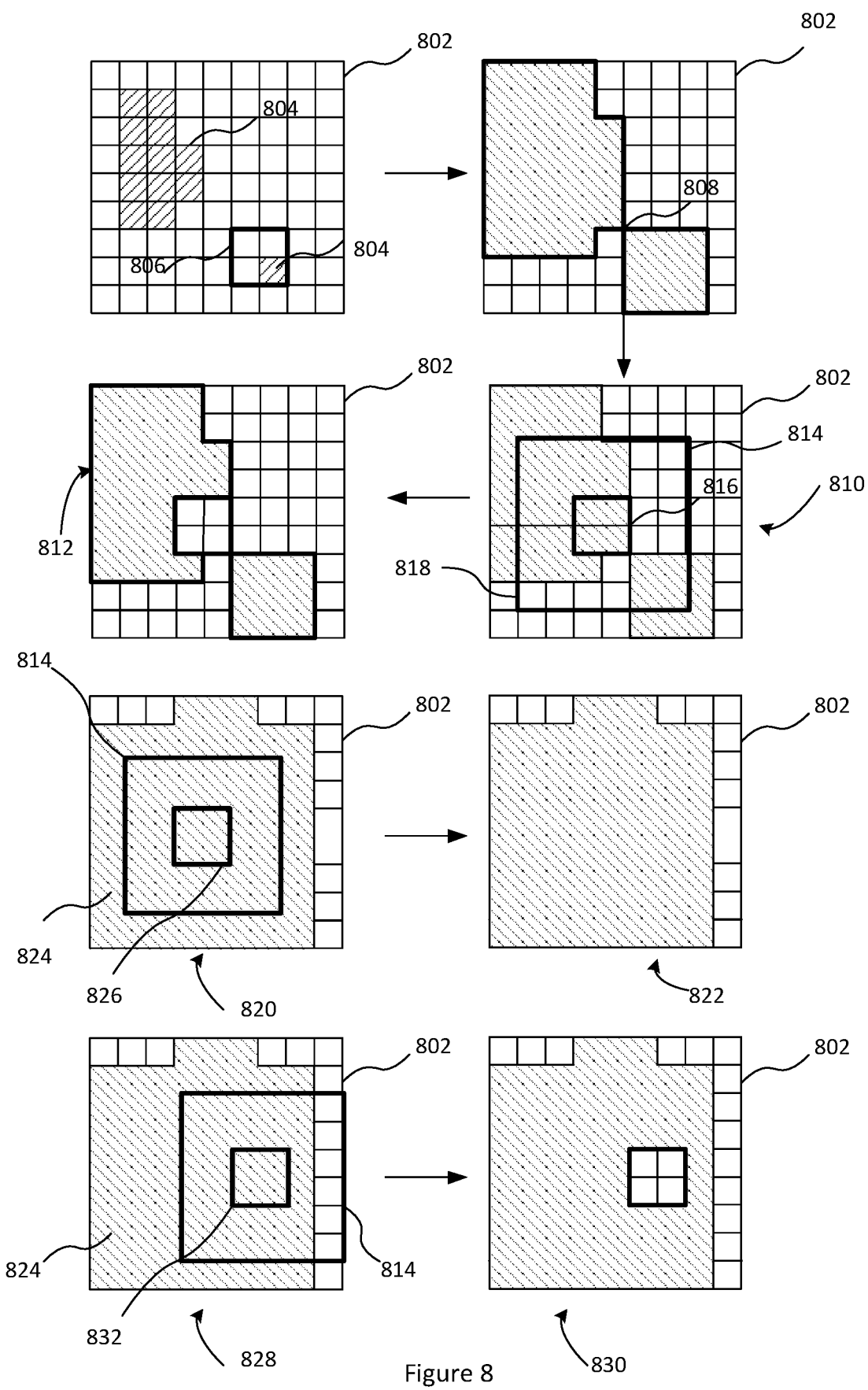
FIG. 8 shows a sequence of flag values for a frame during an erode operation.

An example of how the false-alarm detector may perform the large-area protection test will now be described with reference to FIG. 8, which shows a sequence of processing steps applied by the false alarm detector to the frame $F_n$ (denoted 802). Initially, the false-alarm detector receives the candidate block flags $R_b$. The blocks of the frame $F_n$ with set flags $R_b$ (i.e. the candidate blocks) are illustrated by the hatched markings at 804. The false-alarm detector then determines a candidate region in dependence on the candidate blocks. In this example, the candidate region is determined by defining a block region of p by q blocks and setting a block-region flag $F_{br}$ for each block region that encompasses a candidate block. A block region is illustrated at 806, and in this example is 2 by 2 blocks in size. This particular block region does encompass a candidate block and so a block-region flag would be set for this block region. It will be appreciated that a single candidate block may be encompassed by multiple block regions. The candidate region is then formed from the blocks of the frame with a set block-region flag. In this example the candidate region is illustrated by the hatched markings at 808.

The next stage of the large-area protection test is to perform an eroding operation on the candidate region with an eroding kernel. If not all of the candidate region is eroded by the eroding operation, the false alarm detector detects that there is an error. If on the other hand all of the candidate region is eroded by the eroding operation, the false-alarm detector detects that there is no error and identifies the candidate blocks as protected blocks.

To perform the eroding operation the false-alarm detector 404 applies the eroding kernel to each block region within the frame. If there initially exists (i.e. at the point when the kernel is applied) regions of the frame within the kernel that do not have a set block-region flag then the block region to which the kernel is applied is eroded. That is, if there exists at least part of one block region within the eroding kernel that does not have a set flag $F_{br}$, each set flag $F_{br}$ within the block region the kernel is applied to is eroded. This process is illustrated at 810 and 812. 810 shows the eroding kernel 814 being applied to a block region 816. In this case there exist regions of the frame 818 within the eroding kernel that do not form part of the candidate region (i.e. there exists block regions that do not have a set flag $F_{br}$) and thus the block region 816 to which the kernel 814 is applied is eroded. The remaining part of the candidate region after this step of the eroding operation is shown at 812.

An illustration of the eroding operation failing to erode the flags within a block region is shown at 820 and 822. Here an alternative candidate region is shown at 824. The eroding kernel 814 is shown being applied to a block region 826. In this example the entire frame region covered by the erosion kernel forms part of the candidate region. That is, all of the block regions within the erosion kernel have a set flag $F_{br}$. In response to this, the false-alarm detector does not erode the flags within the block region 826 the kernel 814 is applied to (shown at 822). To further illustrate the example, following the application of kernel 814 to block region 826, the kernel may be applied to adjacent block region 832 (shown at 828). In this case, there exists a region of the frame covered by kernel 814 when applied to block region 832 that does not form part of the candidate region, and thus block region 832 is eroded (shown at 830). 830 therefore illustrates the application of the eroding kernel to both candidate block regions 826 and 832.

The eroding operation performed by the false-alarm detector may alternatively be described as applying the eroding kernel to each block region of the frame, and if all of the frame region within the kernel forms part of the candidate region (e.g. all of the block regions within the kernel have a set flag $F_{br}$), outputting a false-alarm flag. If any false alarm flags are set during the eroding operation, the candidate blocks are determined by the false-alarm detector to not be protected blocks.

The eroding kernel may be larger (i.e. cover a greater number of pixels/blocks) than the dilating kernels applied by the candidate block identifier 402. The reason for this is that if the eroding kernel is larger than the dilating kernels, the eroding operation would be expected to completely remove a candidate region that has been characterised as containing a static graphical object. This is based on the presumption that the graphical objects for which motion compensation protection is desired occupy a localized, or sub-region of the frame. Thus, if the eroding operation completely removes the candidate region there can be greater confidence in applying the protection mechanism to the candidate blocks. If however the eroding operation does not completely erode the candidate region, then this may suggest that either: i) the candidate blocks cover a frame region too large for the expected graphical object (e.g. because an object in the frame has been incorrectly identified as the expected graphical object), or ii) the objects identified within the frame are too close to each together to be a graphical object such as a logo or alphanumeric text. In either case the false-alarm detector may output an alarm signal (e.g. in the form of an array of binary values) or an alarm flag that prevents the protection mechanism from being applied to the candidate blocks (i.e. the candidate blocks are not protected from motion compensation).

If the false-alarm detector 404 determines that the candidate blocks are protected blocks, then information identifying those blocks (e.g. the candidate block flags Rb) are output from the block identifier 106 to the motion compensated operation unit 110. The block identifier 106 may for example generate a protective key signal that is input to the motion compensated operation unit 110 and that identifies the protected blocks.

At step 510, the motion compensated operation unit 110 performs a motion compensated operation on blocks of the first frame but excludes the protected blocks. That operation might be, for example, a motion-compensated frame interpolation. That is, the motion compensated operation unit 110 does not perform the motion compensated operation on the protected blocks but it does perform a motion compensated operation on those blocks of the frame that are not identified as protected blocks. The values of the protected blocks may be forced by the motion compensated operation unit 110 to a non-motion compensated blend. The motion compensated operation unit 110 may for example temporally smooth the pixel values of the identified protected blocks of the frame $F_n$ (e.g. by applying a smoothing filter). The values for each protected block might for example be an average of the values for that block in frame $F_n$ and the values for that block in one or other frames of the sequence. The smoothed values of the protected blocks may then be used in a generated interpolated frame (if for example the unit 110 were a motion-compensated interpolator). The pixel values for the remaining blocks of the interpolated frame (i.e. the non-protected blocks) may be determined by motion compensated operation unit 110 using motion vectors determined by the motion estimator 108. The values for the protected blocks of the frame may be independent of the motion vectors determined by motion estimator 108.

Though protected blocks are not subject to the motion-compensated operation performed by unit 110, motion vectors may still be determined for these blocks by the motion estimation unit 108. That is, the motion estimator 108 may operate to generate motion vectors for each motion estimation block of a frame. However, in this case the motion vectors are not used to determine values for the protected blocks within the motion-compensated operation unit 110. Nevertheless, it may still be desirable to compute motion estimation vectors for protected blocks because some motion estimation processes are iterative—for example a motion vector for a block may be computed from the motion vectors of one or more neighbouring blocks—meaning that it may not be desirable to simply avoid performing motion estimation for protected blocks. In other examples, the protective key signal identifying the protected blocks might be output from block identifier 106 to motion estimator 108 in addition to motion-compensated operation unit 110. The motion estimator 108 might then perform motion estimation to generate motion vectors for blocks in dependence on the protected blocks. For example, if the motion estimation unit 108 operates on larger sized blocks than the block identifier 106 (i.e. protection blocks are smaller than motion-estimation blocks), the situation may arise where only some of pixels in a motion estimation block are protected. In this case, the motion estimator 108 may use the protective key signal from block identifier 106 to mask the protected blocks within the motion estimation block, such that the motion estimator 108 only considers the non-protected parts of a motion estimation block when determining a motion vector for that block. In the case of a moving background under a static logo, this might enable the motion estimator 108 to detect the background motion. This vector may then propagate to areas away from the logo, or, the motion estimator may be able to estimate an otherwise uniform motion vector field despite the presence of the logo.

The above described method performed by the processor unit 100 enables graphical objects such as broadcaster logos, subtitles etc. to be identified and protected from motion compensation/FRC artefacts. This may improve the perceived quality of a video sequence that has been subjected to frame rate conversion by reducing the artefacts in generated interpolated frames. By performing a dilation operation on blocks suspected of representing a graphical object requiring protection from motion compensation, the protection mechanism described herein enables frame regions to be identified and protected with a per-block resolution whilst not requiring the regions to be per-character block accurate (that is, blocks may be characterised as representing a static graphical object via the dilation operation that do not in fact represent the static graphic object). This allows the desired static graphic objects to be protected without the more complex and expensive processing required to identify the graphical objects with per-character block accuracy. It may also avoid the potentially significant occlusion problems that may be present in the inter-character spaces of the frame.

Figure 9:
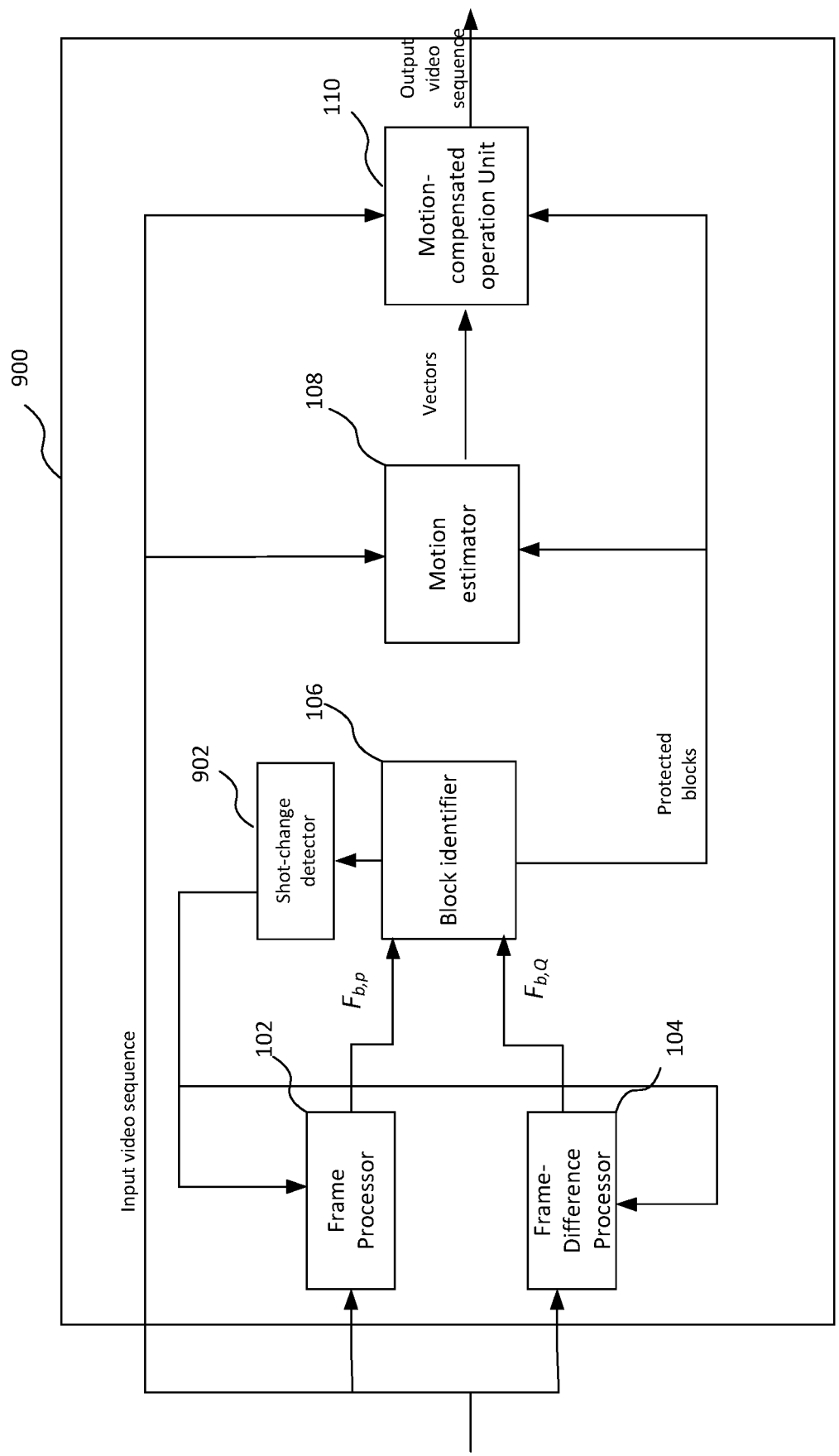
FIG. 9 shows a schematic illustration of an alternative motion compensated process unit for protecting regions of an image from a motion compensation operation.

The processor unit 900 may additionally comprise a shot detector configured to detect a shot change, or shot transition, between successive frames of a video sequence. An example of such a processor unit 900 is shown in FIG. 9. Here, a shot-change detector 902 is coupled to the block identifier 106 and to the frame processor 102 and frame-difference processor 104.

The shot-change detector may detect when a protected graphical object has been removed from the images depicted by frames of the input video sequence (for example it is typically the case that text representing subtitles is present within a number of frames before being removed and/or replaced by new text). The shot change detector may detect the shot change by performing a shot-change algorithm. The shot change detector may be particularly useful in the event that the filter modules 202 and 302 comprise recursive filters for calculating the scores used to characterise the blocks. This is because in this case the score for a block is dependent upon the scores associated with corresponding blocks of previous frames. Thus, the situation may arise, for example, where a block has a score indicative of a high confidence level that the block represents a graphical object even though the block forms part of a frame that has recently undergone a shot change in which the graphical object was removed. The shot-change detector may prevent the erroneous characterization of blocks by resetting the recursive filters in response to detecting a shot change.

For example, in response to detecting a shot change, the shot-change detector may output a shot-change flag, or shot-change signal, to the frame processor 102 and frame-difference processor 104. In response to receiving the shot-change signal, the filter modules 202 and 302 reset their recursive filters (e.g. by deleting or wiping the stored block scores for the previous frame). This may prevent blocks belonging to a frame that has recently undergone a shot change from being erroneously characterised as representing a graphical object.

Figure 10:
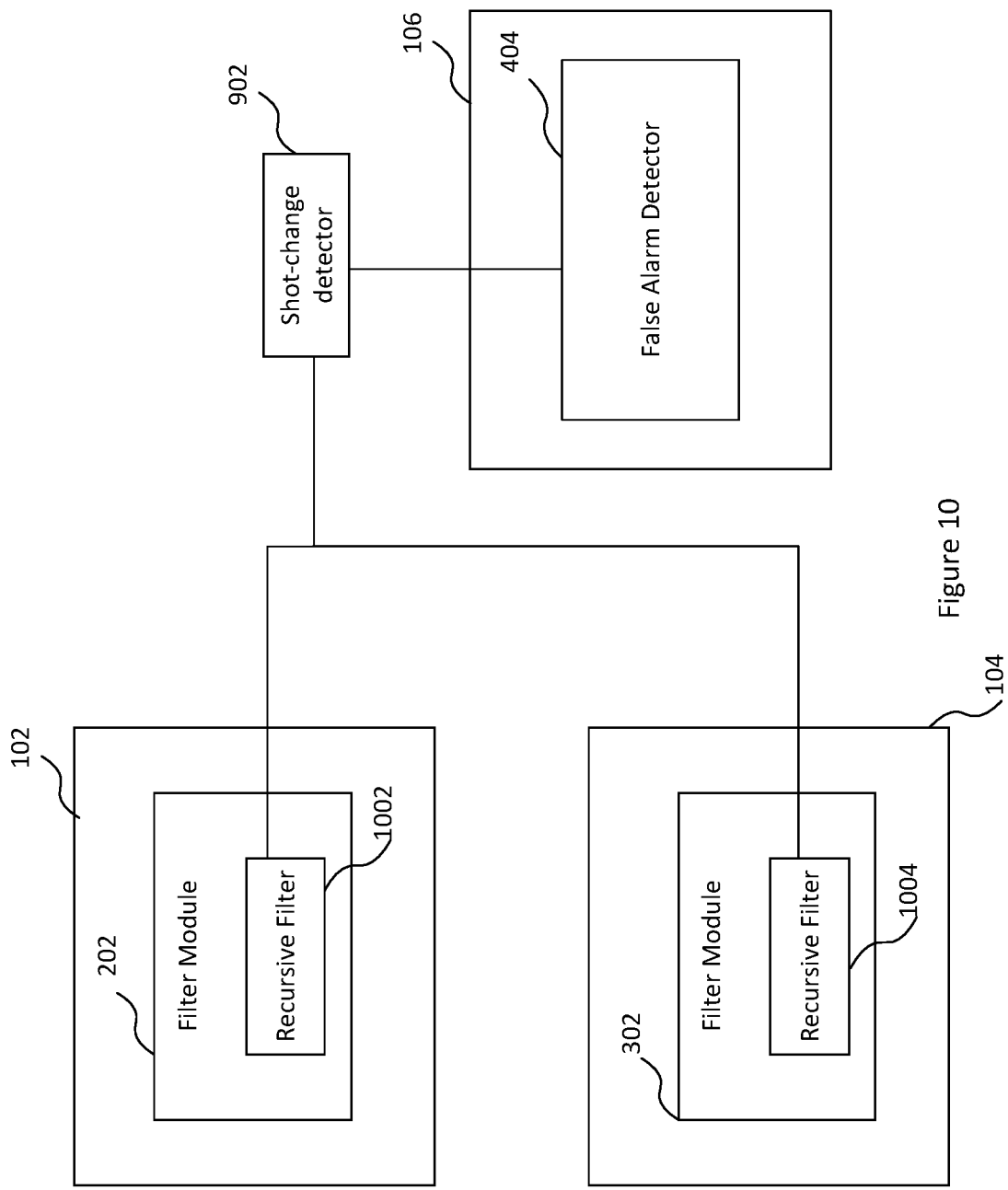
FIG. 10 shows an example arrangement of the motion compensated process unit shown in FIG. 9.

The shot-change detector may be configured to only operate on regions of the frame identified as protected blocks (e.g. by only performing the shot change detection algorithm on identified protected blocks). This may reduce the processing power required to run the shot-change algorithm by limiting its use to regions of the frame that have been identified as containing the graphical object. The shot change detector may therefore be coupled to the output of the false alarm detector 404 as shown in FIG. 10. FIG. 10 also shows the frame difference processor 102 that comprises filter module 202 having a recursive filter 1002 that is coupled to the shot-change detector 902; and frame-difference processor 104 that comprises filter module 302 having a recursive filter 1004 also coupled to the shot-change detector 902. The remaining components of the processor unit have been omitted from FIG. 10 for the purposes of clarity.

In the examples described above, reference has been made to 'first' and 'second' frames of a video sequence. It is to be understood that these labels are not to be interpreted as implying a temporal order between the frames: the first frame may refer to a frame that occurs within the video sequence at a point in time before or after the second frame. Neither are the first and second frames necessarily successive frames (either before or after the insertion of any interpolated frames). That is, the first and second frames may be separated by one or more intermediary frames of the video sequence. These intermediary frames may themselves be interpolated from existing frames of the sequence.

In the examples above, the filters within frame processor 102 and frame difference processor 104 operate on the luma values of the blocks. The luma value may be chosen because the luma (Y) channel carries most of the information content of a YUV format image. However, it will be appreciated that the filters may operate on different types of pixel values other than luma. For example, the filters (e.g. filters 202 and 302) may operate on pixel values from another channel, such as the U or V channel of a YUV image, or the R, G, or B channel of an RGB image. In other examples the filters may operate on a quantity derived (e.g. using a weighted sum) from the pixel values of one or more channels of the image. It will be appreciated that the filters may still operate in a similar way to that described above if operating on pixel values from a different channel, e.g. to enhance image features depicted by the frame that have characteristics that are indicative, or suggestive, of the image feature being a graphical object. Similarly, the scores $P_{b,n}$ and $Q_{b,n}$ can in general be a pixel value associated with a block from a channel/combination of channels of the image (e.g. the U or V channel of a YUV image, or the R, G, or B channel of an RGB image).

The processor units of FIGS. 1 to 4 and 9 to 10 are shown as comprising a number of functional blocks. This is schematic only and is not intended to define a strict division between different logic elements of such entities. Each functional block may be provided in any suitable manner. It is to be understood that intermediate values described herein as being formed by a unit/processor/module etc. need not be physically generated by the unit/processor/module etc. at any point and may merely represent logical values which conveniently describe the processing performed by the unit/processor/module between its input and output.

The processor units described herein may be embodied in hardware on an integrated circuit. The processor units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a processor unit configured to perform any of the methods described herein, or to manufacture a processor unit comprising any apparatus described herein. An integrated circuit definition dataset may be, for example, an integrated circuit description.

There may be provided a method of manufacturing, at an integrated circuit manufacturing system, a processor unit as described herein. There may be provided an integrated circuit definition dataset that, when processed in an integrated circuit manufacturing system, causes the method of manufacturing a processor unit to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (®) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processor unit will now be described with respect to FIG. 12.

Figure 12:
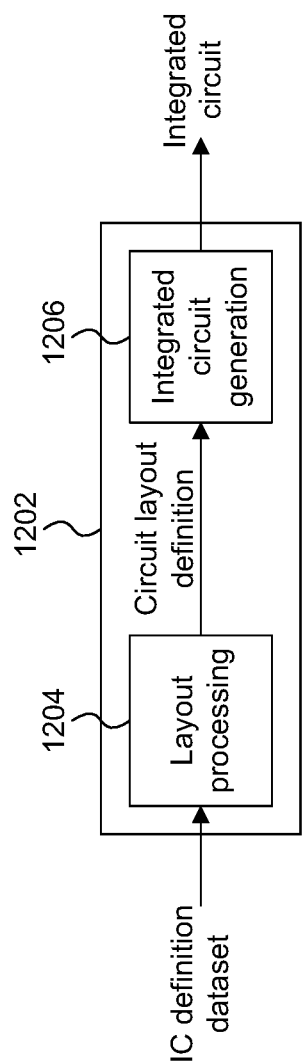
FIG. 12 is a schematic diagram of an integrated circuit manufacturing system.

FIG. 12 shows an example of an integrated circuit (IC) manufacturing system 1202 which is configured to manufacture a processor unit as described in any of the examples herein. In particular, the IC manufacturing system 1202 comprises a layout processing system 1204 and an integrated circuit generation system 1206. The IC manufacturing system 1202 is configured to receive an IC definition dataset (e.g. defining a processor unit as described in any of the examples herein), process the IC definition dataset, and generate an IC according to the IC definition dataset (e.g. which embodies a processor unit as described in any of the examples herein). The processing of the IC definition dataset configures the IC manufacturing system 1202 to manufacture an integrated circuit embodying a processor unit as described in any of the examples herein.

The layout processing system 1204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. A circuit layout definition may be, for example, a circuit layout description.

The IC generation system 1206 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1206 can use to form a suitable mask for use in generating an IC.

The different processes performed by the IC manufacturing system 1202 may be implemented all in one location, e.g. by one party. Alternatively, the IC manufacturing system 1202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processor unit without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The processor units described herein may be embodied in hardware on an integrated circuit. The processor units described herein may be configured to perform any of the methods described herein.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A processor unit configured to identify blocks of a frame of a video sequence to be excluded from a motion-compensated operation, the processor unit comprising:
   a frame processor configured to process pixel values of a first frame to characterise blocks of one or more pixels of the first frame as representing at least a portion of a graphic object;
   a frame-difference processor configured to determine difference values between blocks of the first frame and corresponding blocks of a second frame, and to process said difference values to characterise blocks of the first frame as representing an image component that is static between the first and second frames;

a block identifier configured to identify blocks of the first frame as candidate blocks in response to determining that said blocks are characterised as: (i) representing a graphic object; and (ii) representing an image component that is static between the first and second frames, the block identifier comprising a false-alarm detector configured to perform a large-area protection test to determine whether the candidate blocks cover a frame area larger than a predetermined threshold area so as to be indicative of an error in the characterization of the blocks, and if so to determine that the candidate blocks are not protected blocks; and if not to identify the candidate blocks as protected blocks;

wherein the identification of the protected blocks is outputted to a motion-compensated operation unit such that the motion-compensated operation unit does not operate on the identified protected blocks in performing the motion compensated operation.

2. The processor unit according to claim 1, wherein the block identifier is configured to generate a protective key signal that identifies the protected blocks to be protected from the motion compensation operation.

3. The processor unit according to claim 1, wherein the motion-compensated operation unit is configured to perform the motion compensated operation on the first frame using motion vectors for blocks of the first frame generated by a motion estimator, the motion-compensated operation unit being configured to perform the motion compensated operation on non-protected blocks of the first frame and to exclude the protected blocks of the first frame from the motion-compensated operation.

4. The processor unit according to claim 3, wherein the motion compensated operation unit forces values of protected blocks to a non-motion compensated blend.

5. The processor unit according to claim 1, wherein the frame processor comprises a filter module configured to perform a filtering stage on the first frame to enhance image features having characteristics indicative of a graphic object.

6. The processor unit according to claim 5, wherein the frame-difference processor comprises a filter module configured to perform a filtering stage on the difference values to enhance image features depicted by the difference values having characteristics indicative of a graphic object.

7. The processor unit according to claim 6, wherein the filter module of the frame processor and the filter module of the frame-difference processor are configured to enhance edges of features having characteristics indicative of the graphical object.

8. The processor unit according to claim 1, wherein the frame processor is configured to generate a first score for each block of the first frame indicative of a confidence level that said block represents at least a portion of the graphic object.

9. The processor unit according to claim 8, wherein the frame processor comprises a thresholding unit configured to, for each block of the first frame, characterise the block as representing at least a portion of the graphic object in dependence on a comparison of the first score with a first threshold value.

10. The processor unit according to claim 8, wherein the frame processor further comprises a dilation unit configured to perform a dilation operation using a dilating kernel, the dilation operation comprising applying the dilating kernel to blocks with a first score indicative of a high confidence level.

11. The processor unit according to claim 10, wherein a block with a high confidence level is determined from a comparison of the first score of the first block with a second threshold value and the dilation operation comprises characterising each block within the dilating kernel as representing the graphic object.

12. The processor unit according to claim 1, wherein the frame-difference processor is configured to generate a second score for each block of the first frame indicative of a confidence level that said block represents a static image component.

13. The processor unit according to claim 12, wherein the frame-difference processor comprises a thresholding unit configured to, for each block of the first frame, characterise the block as not representing a static image component in dependence on a comparison of the second score for that block with a third threshold value.

14. The processor unit according to claim 13, wherein the frame-difference processor is configured to determine the blocks characterised as representing a static image component from the blocks characterised as not representing a static image component.

15. The processor unit according to claim 12, wherein the frame-difference processor further comprises a dilation unit configured to perform a dilation operation using a dilating kernel, the dilation operation comprising applying the dilating kernel to blocks with a second score indicative of a low confidence level and characterising each block within the dilating kernel as not representing a static image component.

16. The processor unit according to claim 1, wherein the block identifier comprises a candidate-block identifier configured to identify blocks of the first frame as candidate protected blocks.

17. The processor unit according to claim 16, wherein the large-area protection test comprises: i) determining a candidate region of the first frame in dependence on the candidate blocks; ii) performing an eroding operation on the candidate region using an erosion kernel; and iii) determining that the candidate blocks cover a frame area indicative of an error if not all of the candidate region is eroded by the eroding operation and determining that the candidate blocks do not cover a frame area indicative of an error if all of the candidate region is eroded by the eroding operation.

18. The processor unit according to claim 17, wherein the eroding operation comprises applying the eroding kernel to a block region of the first frame and eroding any part of the candidate region within the block region only if there exists within the eroding kernel blocks that do not form part of the candidate region when the kernel is applied.

19. A method of identifying blocks of a frame of a video sequence to be excluded from a motion-compensated operation, the method comprising:
processing pixel values of a first frame to characterise blocks of one or more pixels of the first frame as representing at least a portion of a graphic object;
determining difference values between blocks of the first frame and corresponding blocks of a second frame;
processing said difference values to characterise blocks of the first frame as representing an image component that is static between the first and second frames;
identifying blocks of the first frame as candidate blocks in response to determining that said blocks are characterised as: (i) representing a graphic object; and (ii) representing an image component that is static between the first and second frames,
performing a large-area protection test to determine whether the candidate blocks cover a frame area larger than a predefined threshold area so as to be indicative of an error in the characterization of the blocks, and if so determining that the candidate blocks are not protected blocks; and if not identifying the candidate blocks as protected blocks; and outputting the identified protected blocks and performing the motion-compensated operation such that the motion-compensated operation is not performed on the identified protected blocks.

\* \* \* \* \*